United States Patent [19]

Montgomery

[11] 4,290,810
[45] Sep. 22, 1981

[54] METHOD FOR FACILITATING TRANSPORTATION OF PARTICULATE ON A CONVEYOR BELT IN A COLD ENVIRONMENT

[75] Inventor: Carl T. Montgomery, Sperry, Okla.

[73] Assignee: The Dow Chemical Co., Midland, Mich.

[21] Appl. No.: 36,219

[22] Filed: May 4, 1979

Related U.S. Application Data

[63] Continuation of Ser. No. 860,501, Dec. 14, 1977, Pat. No. 4,162,347.

[51] Int. Cl.$^3$ .......................... B32B 9/04; C09K 3/118
[52] U.S. Cl. .......................................... 106/13; 106/3; 106/287.13; 260/29.2 M
[58] Field of Search .................. 106/3, 13, 287.13; 260/29.2 M; 44/6

[56] References Cited

U.S. PATENT DOCUMENTS

| | | | |
|---|---|---|---|
| 2,101,472 | 12/1937 | Kormann | 106/13 |
| 2,116,682 | 5/1938 | Kleinicke | 134/27 |
| 2,222,370 | 11/1940 | Mori | 169/2 |
| 2,373,727 | 4/1945 | West et al. | 106/13 |
| 2,436,186 | 2/1948 | Kleinicke | 252/38 |
| 2,454,886 | 11/1948 | Sapiro | 106/128 |
| 2,716,068 | 8/1955 | Fain et al. | 106/13 |
| 3,298,804 | 1/1967 | Schoek | 44/6 |
| 3,350,314 | 10/1967 | Dautrey et al. | 252/70 |
| 3,362,910 | 1/1968 | Ordelt et al. | 252/75 |
| 3,624,243 | 11/1971 | Scott et al. | 252/70 |
| 3,625,715 | 12/1971 | Nasca | 260/29.2 M |
| 3,630,913 | 12/1971 | Scott et al. | 252/70 |
| 3,711,409 | 1/1973 | Ayers et al. | 252/70 |
| 3,713,851 | 1/1973 | Cekada | 260/29.2 M |
| 3,794,472 | 2/1974 | Macaluso et al. | 44/6 |
| 4,117,214 | 9/1978 | Parks et al. | 427/220 |
| 4,133,921 | 11/1976 | Palcher | 106/3 |
| 4,162,347 | 7/1979 | Montgomery | 106/13 |
| 4,163,079 | 7/1979 | Beafore | 106/13 |

FOREIGN PATENT DOCUMENTS

367852 6/1937 Canada.
2413198 2/1975 Fed. Rep. of Germany.
1055453 1/1967 United Kingdom.

OTHER PUBLICATIONS

Society of Mining Engineers of AIME, "Freeze Conditioning Frozen Coals to Ease Handling and Unloading Problems", Oct. 21, 1977, Nimerick et al.
Abstract of F. Nicolai, Automobile Tech. Z., 32[36], 843–846, 1929.
"Mechanical Strength of Ice Frozen Froman Impure Melt", E. R. Pounder, Canadian Journal of Physics, vol. 36, 1958.
"The Effect of Impurities on the Mechanical Strength of Accreted Ice", I. H. Bailey et al., Journal of the Atmospheric Sciences, vol. 24, 707–710, 1967.

*Primary Examiner*—Allan Lieberman
*Attorney, Agent, or Firm*—D. H. Fifield

[57] ABSTRACT

Coal and other particulate can be transported on a conveyor belt exposed to winter weather conditions with reduced slippage of the particulate on the belt surface by periodically treating the belt surface with from about 0.001 to about 0.005 gallons per square foot of belt surface (0.04–0.4 liters/sq. meter) of a composition containing a small amount of a dimethyl polysiloxane with the balance consisting substantially of water soluble components comprising (A) a water soluble polyhydroxy compound or monoalkyl ether thereof, and (B) a water soluble organic nonvolatile compound having at least one hydrophilic group, (A) being different from (B).

8 Claims, No Drawings

METHOD FOR FACILITATING TRANSPORTATION OF PARTICULATE ON A CONVEYOR BELT IN A COLD ENVIRONMENT

CROSS REFERENCE TO RELATED APPLICATION

This is a continuation of application Ser. No. 860,501, filed Dec. 14, 1977, now U.S. Pat. No. 4,162,347 issued July 24, 1979.

I. BACKGROUND OF THE INVENTION

A. Field of the Invention

This invention relates to a method for improving the efficiency of a conveyor belt in transporting particulate solids, particularly at temperatures below freezing, i.e., 0° C.

B. Description of the Prior Art

In transporting particulate solids such as coal, ores, gravel, and other substantially water insoluble particulates on conveyor belts, a serious problem is that in freezing temperatures, a substantial amount of slippage occurs between the particulate and the belt surface as ice accumulates on the belt surface, on the surfaces of the particles, or on both. The problem is particularly severe where at least a portion of the belt is outdoors and thus exposed to moisture from sleet and snow as well as to moisture from condensation and that which may be on the surface of the particulate. Obviously, such slippage results in decreased material handling efficiency, wasted energy in driving the belt under inefficient conditions, and in severe conditions can result in a temporary plant shut down, e.g., if coal cannot be delivered to its point of use at a sufficient rate to maintain a furnace or boiler at proper operating conditions.

Various techniques have been tried to alleviate the slippage problem, such as spraying the belt with ethylene glycol. Conventional antifreeze compositions, however, have not been regarded as a completely acceptable solution to the problem, since benefits seem to be realized only at mild freezing temperatures, e.g., temperatures above about 20° F. ($-6°$ C.). Consequently, smudge pots or heaters are often placed near a belt to heat the belt. However, in the event the conveyor must be stopped for a brief period, the heat sources near the belt are a serious hazard since not infrequently, the belts are burned by the heat source.

Various deicing or freeze depressant compositions have been taught, particularly for use on aircraft. Representative of this art are the following patents:

Korman, U.S. Pat. No. 2,101,472, which teaches a gel containing gelatine to which is added as an antifreeze substance, glycerol and/or a glycol; West et al., U.S. Pat. No. 2,373,727, which teaches a composition such as in Korman, but also including a hydrocarbon to provide an emulsion; Fain et al., U.S. Pat. No. 2,716,068, which teaches a composition of a glycol, at least one of potassium thiocyanate, potassium acetate, urea, or certain inorganic salts, and optionally sodium nitrite; British 1,055,453 which teaches a deicing composition of at least one water soluble monohydric alcohol, at least one water soluble polyhydric alcohol, and formamide or a formamide derivative; and Dawtrey et al., U.S. Pat. No. 3,350,314, which teaches a foamable composition of water, an alkylene polyol, and a long chain aliphatic tertiary amine.

Ordelt et al., U.S. Pat. No. 3,362,910, teaches an automotive antifreeze composition.

Scott, Jr., et al., U.S. Pat. Nos. 3,624,243 and 3,630,913, each relate to chemical deicers containing corrosion inhibitors making them specially suited for use on airport runways.

Shapiro, U.S. Pat. No. 2,454,886 relates to the prevention of mist and frost on glass and similar sheet material.

In a commonly assigned application entitled "Method for Reducing the Strength of Ice" by Christ F. Parks and Kenneth H. Nimerick, Ser. No. 855,528 filed Nov. 28, 1977, now U.S. Pat. No. 4,117,214 issued Sept. 26, 1978 which is a continuation-in-part of Ser. No. 380,778 filed July 19, 1973, now abandoned it is disclosed a multicomponent composition similar to that employed herein reduces the strength of ice, and that a mass of particulate solids treated with the composition may be easily broken apart even after the mass is exposed to temperatures sufficient to permit ice to form because the ice which forms is of substantially reduced compressive strength.

There is no suggestion, however, that any of these formulations could be effectively used on conveyor belts.

In an invention on which a patent application is being filed concurrently herewith, now U.S. Pat. No. 4,163,079 issued July 31, 1979, Frank J. Beafore has discovered that the composition employed in the invention of Parks et al. is effective in meeting the problem of particulate slippage on belts at temperatures of less than 0° C. The present invention is a further refinement of the invention of Beafore.

Finally, dimethyl polysiloxanes have been used as release agents for conveyor belts. See, for example, Dow Corning Corporation Bulletin 22-082 (March, 1972) "Information About Release Agents: Dow Corning HV-490 Emulsion". However, so far as is known there has been no suggestion to use the dimethyl polysiloxanes in the manner of the present invention.

II. Summary of the Invention

The present invention is a method for facilitating the transportation of particulate solids on a conveyor belt under conditions such that at least a portion of the belt surface is exposed to a temperature of less than 0° C. during operation of the belt. The crux of the invention lies in contacting the belt surface with from about 0.001 to about 0.005 gallons per square foot of belt surface (0.04–0.2 liters per square meter) with a particular treating fluid. The treating fluid employed in the present method contains from about 0.05 to about 2 percent by weight a dimethyl polysiloxane, with the balance consisting substantially of water soluble components comprising (A) a water soluble polyhydroxy compound or monoalkyl ether thereof, and (B) a water soluble organic nonvolatile compound having at least one hydrophilic group, compound (B) being different from (A) in any given formulation.

The above specified rate of application is fairly critical. If too little is applied, an objectionable ice build-up is realized. On the other hand, too much treating fluid actually tends to lubricate the belt surface.

By "consists substantially (or consisting substantially) of water soluble components", is meant that compositions containing substantial quantities, i.e., about 5 percent or more, of water immiscible liquids are not intended for use herein.

By "water soluble" in reference to each of Components (A) and (B) is meant sufficiently soluble so that a sufficient quantity of said compound may be dissolved in water to noticeably affect the strength of any ice formed from the water, when employed with the other components according to the invention. Obviously, use of Components (A) and (B) herein in quantities or proportions which would cause a significant phase separation or precipitation is generally undesirable and is therefore avoided.

Treatment of the belt with the aforementioned composition removes ice already on the belt and keeps the belt free of quantities of ice detrimental to the transportation of particulate solids on the belt for hours.

III. Further Description of the Invention

The chemical mechanism by which the present invention operates is not completely understood, but the ability of the composition employed to reduce the strength of ice is believed to play a significant part in its ability to keep the belt surface free from a detrimental accumulation of ice, even at fairly low concentrations and cold temperatures, e.g., below 20° F. ($-7°$ C.) and even below 0° F. ($-18°$ C.). Thus, though some ice may form, it is of reduced compressive strength and is easily broken up by the moving particulate and therefore does not accumulate to any appreciable extent. The polysiloxane is believed to help keep ice from adhering to the belt, but alone has little if any ability to remove any ice already on the belt.

The invention may be employed with all forms of divided solids which themselves are neither water-soluble nor water swellable. Representative of such materials are various forms of coal, mineral ores such as bauxite, iron ore, copper ore, taconite, and the like.

One of the ingredients (Component A) useful in the compositions employed in the present method is a water-soluble polyhydroxy compound. A preferred group is the polyhydroxyalkanes. Typical members of that class are ethylene glycol, di-ethylene glycol, triethylene glycol, propylene glycol, di-propylene glycol, glycerine and sugar. Of those materials, at least a major proportion of ethylene glycol is preferred. The monoalkyl ethers, such as the monobutyl ether of ethylene glycol, are also useful. Mixtures of alkylene glycols may also be employed as Component A, for example, a mixture such as ethylene glycol and 1,2-propylene glycol, preferably in an approximately 40:60 to 60:40 weight ratio to one another.

The second material (Component B) to be used in the treating of the finely divided particles is a watersoluble organic nonvolatile compound. The compound is substantially nonvolatile, i.e., has a sufficiently low vapor pressure at the conditions of use, so that substantially none of the compound will be lost by vaporization during use. This compound should have at least one hydrophilic group such as amine, carboxyl, or carboxylate groups. The compound may be polymeric or non-polymeric. Typical of the latter are fumaric acid, urea, glycolic acid, tetrasodium salt of ethylene diamine tetraacetic acid, sodium acetate and acetic acid. Other amines and carboxylic materials will be known to the skilled worker. Typical of the polymeric materials are polyacrylamide (preferably but not essentially having at least 10 percent hydrolysis), polyvinyl pyrrolidone, polyethyleneimine, polyacrylates, polyamide copolymers such as that sold commercially as Arco S-232, and the natural gums, such as guar gum. All of the useful polymers will be of relatively low molecular weight in order to be watersoluble. Judicious selection of other useful polymers can be made by reference to standard references with an optimum choice determined by simple preliminary experiment.

The ratio of the hydroxy compound with the organic non-volatile compound may be varied within wide limits, and will depend in large measure on the particle size, the amount of moisture, the condition of exposure of the belt, the texture of the belt surface, the severity of incline of the belt path, and to some extent on the choice of chemicals employed. For example, some of the polymeric substances cause a large increase in viscosity which can make it difficult to apply using spray equipment if used at high concentrations. As a general rule the combination of ingredients will contain about 0.001 to about 2 parts of the organic nonvolatile compound for each part of polyhydroxy compound. Optimum selection will be readily made with simple routine experiments.

Also employed in the composition employed in the present invention is from about 0.05 to about 2 percent by weight of a dimethyl polysiloxane, preferably about 0.1 to 1.5 percent. Dimethyl polysiloxanes and methods for preparing them are well known in the art. Preferably, the polysiloxane is of the type having a kinematic viscosity of at least about 100,000 centistokes. Such compounds are commonly available commercially as aqueous emulsions, e.g., as Dow Corning HV-490 emulsion (aqueous, 35% active polysiloxane). The addition of water to the treating composition is generally undesirable since it dilutes the composition thereby at least somewhat decreasing the ability of the composition to act on moisture on the belt or particulate. However, so long as the total amount of water present in the treating composition prior to use does not exceed about 5 percent by weight, the effect of the small amount of water added by the siloxane emulsion is negligible.

The compositions used in the treatment may also include other materials such as dyes, stabilizers, antioxidants, and other conventionally added materials. However, the composition is substantially free of corrosioninducing metal halide salts, such as calcium chloride.

The treating composition may be applied to the belt surface in any convenient manner, such as with spray, brush, or roller applicators. Preferably, a spray system such as illustrated in FIG. 6 in Society of Mining Engineers Preprint 77-F-371 (October, 1977) is employed.

As hereinabove mentioned, the treating compositions are applied at a rate of from about 0.001–0.005 gal/ft$^2$, and preferably about 0.002–0.004 gal/ft$^2$ (0.08–0.16 l/m$^2$). Depending on the particular compositions, and the conditions of use, treatment, and exposure, slight variation outside these ranges may be tolerated, but too little treating fluid is generally ineffective in keeping the belt substantially free of detrimental ice build-up for any appreciable time, and too much fluid can actually lubricate the belt to the extent that objectionable slippage of the particulate occurs. Similarly, the particular compositions, and the conditions of use, treatment, and exposure will affect the frequency of retreatment. A single treatment may be effective for from about 1 to as many as 8 hours or more. In general, however, from 1 to 4 treatments per 8-hour working shift effectively maintains trouble free operation of the conveyor belt system.

IV. Examples

All parts and percentages are by weight, except as specifically noted.

Examples 1–3 are from said application of Parks et al. They do not specifically illustrate use of the treatment fluids on a conveyor belt, but illustrate that blends of Components A and B are synergistically effective in reducing the strength of ice.

EXAMPLE 1

Ice samples were prepared by first dissolving the desired chemicals into water. The water solution was chilled to about 40° F. before pouring into brass molds.

The brass molds were 2"×2"×2". The molds were sprayed with a mold release agent and placed in a 0° F. freezer for several hours prior to pouring the chilled water solution into the molds. The ice remained in the molds for at least 16 hours at 0° F. before being removed for testing.

The compressive strength of these 2"×2"×2" ice cubes was determined using a Tinius Olsen hydraulic press. The steel jaws of the press were precooled by placing ice between the faces and maintaining a pressure on the ice while it was melting. The cooling time was about five minutes. The ice cubes were then inserted between the steel plates and the plates closed by hydraulic pressure at a rate of 1.7 centimeters per minute. The pressure at which the ice broke was recorded. The results are shown in Table I.

TABLE I

| Agent | | Compressive Strength (psi) |
|---|---|---|
| — | — | 364* |
| 0.1% | polyacrylamide M.W. 6M (30% hydrolyzed) (A) | 287 |
| 0.2% | polyacrylamide M.W. 6M (30% hydrolyzed) (A) | 220 |
| 0.5% | polyacrylamide M.W. 6M (30% hydrolyzed) (A) | 170 |
| 1.0% | polyacrylamide M.W. 6M (30% hydrolyzed) (A) | 148 |
| 0.1% | polyacrylamide (25% hydrolyzed) lightly crosslinked with methylene bis acrylamide | 312 |
| 0.2% | polyacrylamide (25% hydrolyzed) lightly crosslinked with methylene bis acrylamide | 220 |
| 0.5% | polyacrylamide (25% hydrolyzed) lightly crosslinked with methylene bis acrylamide | 280 |
| 1.0% | polyacrylamide (25% hydrolyzed) lightly crosslinked with methylene bis acrylamide | 185 |
| 0.05% | ethylene glycol (EG) | 358 |
| 0.1% | ethylene glycol (EG) | 245 |
| 0.25% | ethylene glycol (EG) | 225 |
| 0.5% | ethylene glycol (EG) | 265 |
| 1.0% | ethylene glycol (EG) | 195 |
| 2.5% | ethylene glycol (EG) | 95 |
| 5.0% | ethylene glycol (EG) | 50 |
| 0.05% | EG + 0.1 (A) | 280 |
| 0.1% | EG + 0.1 (A) | 198 |
| 0.25% | EG + 0.1 (A) | 120 |
| 0.5% | EG + 0.1 (A) | 95 |
| 1.0% | EG + 0.1 (A) | 97 |
| 2.5% | EG + 0.1 (A) | 60 |
| 5.0% | EG + 0.1 (A) | 30 |

*Average of 5 tests

The same trend in the reduction of strength of the ice was shown when the rate of jaw closure was increased to 4 centimeters per minute.

EXAMPLE 2

Numerous materials were used to demonstrate their effectiveness in reducing the strength of ice. The samples were prepared and tested according to the procedures of Example 1. The results are shown in Table II.

TABLE II

| Agent % | Compressive Strength (psi) |
|---|---|
| — | 384 |
| 2.5 Ethylene glycol (EG) | 145 |
| 0.5 Polyvinyl pyrrolidone (M.W. 360,000) | 665 |
| 0.5 Polyvinyl pyrrolidone (M.W. 360,000) + 2.5 EG | 130 |
| 0.5 Guar gum | 1050 |
| 0.5 Guar gum + 2.5 EG | 82 |
| 0.5 Polyacrylate-polyamide copolymer (Arco S-232) | 360 |
| 0.5 Polyacrylate-polyamide copolymer (Arco S-232) + 2.5 EG | 115 |
| 0.5 Polyacrylamide 6M M.W. 30% hydrolysis | 445 |
| 0.5 Polyacrylamide 6M M.W. 30% hydrolysis + 2.5 EG | 67 |
| 0.5 Polyacrylamide-cationic form | 232 |
| 0.5 Polyacrylamide-cationic form + 2.5 EG | 45 |
| 0.5 Sodium polyacrylate | 372 |
| 0.5 Sodium polyacrylate + 2.5 EG | 115 |
| 0.5 Gelatin | 525 |
| 0.5 Gelatin + 2.5 EG | 52 |
| 0.5 (75% polyacrylamide-25% gelatin) + 2.5 EG | 93 |
| 0.5 (50% polyacrylamide-50% gelatin) + 2.5 EG | 93 |
| 0.5 (25% polyacrylamide-50% gelatin) + 2.5 EG | 50 |
| 0.5 Polyacrylamide-nonionic | 610 |
| 0.5 Polyacrylamide-nonionic + 2.5 EG | 65 |
| 2.5 Urea | 750 |
| 2.5 Urea + 2.5 EG | 100 |
| 2.5 Glycolic acid | 345 |
| 2.5 Glycolic acid + 2.5 EG | 62 |
| 2.5 Tetrasodium salt of ethylene diamine tetraacetic acid | 297 |
| 2.5 Tetrasodium salt of ethylene diamine tetraacetic acid + 2.5 EG | 82 |
| 2.5 Sodium acetate | 220 |
| 2.5 Sodium acetate + 2.5 EG | 90 |
| 0.1 Acetic acid | 492 |
| 0.1 EG | 265 |
| 0.1 Acetic acid + 0.1 EG | 115 |
| 0.5 Acetic acid | 325 |
| 0.5 EG | 265 |
| 0.5 Acetic acid + 0.5 EG | 102 |
| 2.5 Acetic acid | 267 |
| 2.5 EG | 95 |
| 2.5 Acetic acid + 2.5 EG | 50 |
| 2.5 Ethylene glycol monobutyl ether | 317 |
| 2.5 Ethylene glycol monobutyl ether + 0.5 polyacrylamide M.W. 6M (30% hydrolysis) | 190 |
| 2.5 Diethylene glycol | 97 |
| 2.5 Diethylene glycol + 0.5% polyacrylamide M.W. 6M (30% hydrolysis) | 57 |
| 2.5 Sugar | 302 |
| 2.5 Sugar + 0.5% polyacrylamide M.W. 6M (30% hydrolysis) | 175 |
| 2.5 Sodium lignate | 537 |
| 2.5 Sodium lignate + 0.5 polyacrylamide M.W. 6M (30% hydrolysis) | 490 |
| 2.5 Triethylene glycol | 215 |
| 2.5 Triethylene glycol + 0.5 polyacrylamide M.W. 6M (30% hydrolysis) | 80 |

EXAMPLE 3

Additional tests using a mixture of ethylene glycol and 1,2-propylene glycol as Component (A) were carried out as in Examples 1 and 2, except that a Baldwin hydraulic press was employed at a jaw closure rate of 7.8 cm/min. Results were as follows:

| Agent, % | Compressive Strength, psi |
| --- | --- |
| Water only | 348 |
| 1.25% propylene glycol + 1.25% ethylene glycol | 124 |
| 2.5% sodium acetate | 115.5 |
| 2.5% a blend of 47.5% ethylene glycol, 47.5% propylene glycol, and 5% sodium acetate | 95 |

The foregoing blend of glycols and sodium acetate may be safely employed with routine precautions and safety equipment, making it attractive for use even by individuals with little training. The blend has been accepted for use in underground mines by the Mining Enforcement and Safety Administration of the U.S. Department of the Interior. Moreover, it is substantially non-corrosive, does not significantly affect coal processing steps, e.g., froth flotation, and does not leave quantities of residues detrimental to blast furnace or coking operations.

In the following Examples, "FCA" denotes the 47.5% ethylene glycol, 47.5% propylene glycol, 5% sodium acetate treating fluid tested in Example 3.

EXAMPLE 4

A Pennsylvania coal preparation plant was experiencing icing on a refuse conveyor belt, causing abnormal slippage of the particulate along the belt surface. The total length of the belt was about one mile. FCA was sprayed on the 36-inch wide belt at a rate of about 0.006–0.015 gallon per linear foot. At the time of application, the temperature was $-15°$ C. $(+5°$ F.) and winds were reported at about 25 miles per hour. Following treatment, the belt was immediately placed back in service, and no noticeable product slippage or detrimental ice accumulation was observed for several hours.

EXAMPLE 5

A butyl rubber inner tube was cut into approximately 6 inch squares. To each except the control was applied 0.0025 gal/ft$^2$ of a treating fluid. The corners of each square were brought together to form a cup, each cup was filled with about 100 ml. of water, and then placed in a 0° F. freezer for one day. Each cup was removed from the freezer, the ice was immediately removed as well as possible from the rubber, the cup refilled with water but without another treatment, and returned to the freezer. After two days, each cup was again cleaned, refilled, and refrozen. A final observation was made five days later. In each instance, the ice was very strongly adhered to the control cup. In the cups which had initially been treated either with FCA or with the 60:30:10 mixture of ethylene glycol, potassium thiocyanate, and sodium nitrite described in Fain et al., U.S. Pat. No. 2,716,068, the ice was not frozen to the cup after the first two observations but was after the final observation. The composition of Fain et al., however, was difficult to prepare: some undissolved solids were present even after two hours of agitation.

EXAMPLE 6

Using inner tube squares as discussed in Example 5, the effect of a polysiloxane was tested. In this test, the precise amounts of treating fluid applied was not quantitatively measured, but visually uniform applications were made before the cup was filled with water the first time. Each cycle consisted of approximately 24 hours at 0° C. Results were as follows:

| Treating Fluid | Cycle 1 | Cycle 2 | Cycle 3 | Cycle 4 |
| --- | --- | --- | --- | --- |
| [None] | Stuck-Ice will not release | Not run | Not run | Not run |
| FCA | Clean release | Stuck | Not run | Not run |
| By volume, 95% FCA 5% HV490* | Clean release | Clean release | Clean release | Stuck |
| HV490* | Clean release | Clean release | Clean release | Stuck |

*Dow Corning HV490 emulsion, hereinabove described.

What is claimed is:

1. A composition for treating a belt surface consisting essentially of from about 0.05 to about 2% by weight a dimethyl polysiloxane, with the balance consisting essentially of water soluble components
   (A) a water soluble polyhydroxy compound or monoalkyl ether thereof, and, per part by weight of (A),
   (B) from about 0.001 to about 2 parts a water soluble nonvolatile organic compound having at least one hydrophilic group, said compound (B) being different from said compound (A),
said composition being substantially free of corrosion inducing metal halide salts and said water soluble components contain less than about 5% of water immiscible liquids.

2. The composition of claim 1 wherein (A) consists of at least one alkylene glycol.

3. The composition of claim 1 wherein the hydrophilic group in (B) is amine, carboxyl, or carboxylate.

4. The composition of claim 3 wherein (A) consists of a mixture of ethylene glycol and propylene glycol and (B) is sodium acetate.

5. The composition of claims 1, 2, 3 or 4 wherein the siloxane is of the type having a viscosity of about 100,000 centistokes.

6. The composition of claim 1 wherein from about 0.1 to about 1.5 percent by weight of dimethyl polysiloxane is present.

7. The composition of claim 1 or 2 wherein (B) consists of at least one carboxylic acid comprising up to four carbon atoms or salt thereof.

8. The composition of claim 7 wherein said carboxylic acid is a monocarboxylic acid.

\* \* \* \* \*

UNITED STATES PATENT AND TRADEMARK OFFICE
CERTIFICATE OF CORRECTION

PATENT NO. : 4,290,810
DATED : Sep. 22, 1981
INVENTOR(S) : Carl T. Montgomery

It is certified that error appears in the above—identified patent and that said Letters Patent is hereby corrected as shown below:

In Title, change "METHOD" to --COMPOSITION--.

Signed and Sealed this

Twelfth Day of January 1982

[SEAL]

Attest:

Attesting Officer

GERALD J. MOSSINGHOFF

Commissioner of Patents and Trademarks